United States Patent
Sato et al.

(10) Patent No.: US 11,669,651 B2
(45) Date of Patent: Jun. 6, 2023

(54) DESIGN ASSIST APPARATUS, DESIGN ASSIST METHOD, AND DESIGN ASSIST PROGRAM FOR A MECHANICAL DEVICE DRIVEN BY A FEEDBACK CONTROLLED ELECTRIC MOTOR

(71) Applicants: MIKI PULLEY CO., LTD., Kanagawa (JP); NATIONAL UNIVERSITY CORPORATION KOBE UNIVERSITY, Hyogo (JP)

(72) Inventors: Ryuta Sato, Hyogo (JP); Atsushi Nagao, Fukuoka (JP); Takeshi Hashimoto, Kanagawa (JP); Taichi Sasaki, Kanagawa (JP)

(73) Assignees: MIKI PULLEY CO., LTD, Kanagawa (JP); NATIONAL UNIVERSITY CORPORATION KOBE UNIVERSITY, Hyogo (JP)

( * ) Notice: Subject to any disclaimer, the term of this patent is extended or adjusted under 35 U.S.C. 154(b) by 182 days.

(21) Appl. No.: 16/955,341

(22) PCT Filed: Dec. 17, 2018

(86) PCT No.: PCT/JP2018/046419
§ 371 (c)(1),
(2) Date: Jun. 18, 2020

(87) PCT Pub. No.: WO2019/124324
PCT Pub. Date: Jun. 27, 2019

(65) Prior Publication Data
US 2021/0012043 A1      Jan. 14, 2021

(30) Foreign Application Priority Data
Dec. 19, 2017   (JP) .............................. JP2017-242589

(51) Int. Cl.
*G06F 30/17*   (2020.01)
*G06F 30/20*   (2020.01)
(Continued)

(52) U.S. Cl.
CPC .............. *G06F 30/17* (2020.01); *G05B 11/38* (2013.01); *G05B 11/40* (2013.01); *G05D 3/20* (2013.01);
(Continued)

(58) Field of Classification Search
CPC ...... G06F 30/17; G06F 30/20; G06F 2111/10; G05D 3/20; G05D 3/12; H02P 29/00;
(Continued)

(56) References Cited

U.S. PATENT DOCUMENTS 6,144,181 A * 11/2000 Rehm ...................... G05B 5/01
                                                         318/609
6,259,221 B1 * 7/2001 Yutkowitz .............. G05B 11/42
                                                         318/696
(Continued)

FOREIGN PATENT DOCUMENTS

CA      2663742         3/2007
JP      H09218703       8/1997
(Continued)

OTHER PUBLICATIONS

Mancisidor et al. "Hardware-in-the-loop simulator for stability study in orthogonal cutting". Control Engineering Practice 44 (2015) 31-44. (Year: 2015).*

(Continued)

*Primary Examiner* — Eunhee Kim
(74) *Attorney, Agent, or Firm* — Dority & Manning, P.A.

(57) ABSTRACT

In the design of a mechanical component for a mechanical device driven by a feedback controlled electric motor, the user is enabled to easily know how the properties of (Continued)

mechanical component affect the generation of abnormal vibrations of the mechanical device. In a design assist apparatus (1), the processor (11) is configured to set a plurality of parameters of a mathematical model of an analysis target component selected from one or more mechanical components (24, 56, 58) forming the mechanical device, compute a pole of a transfer function of the mechanical device associated with one or more vibration modes of the mechanical device according to the parameters, and create a stability determination diagram including an isoline of a real part of the pole of the transfer function.

6 Claims, 17 Drawing Sheets

(51) Int. Cl.

| | | |
|---|---|---|
| *G05B 11/38* | (2006.01) | |
| *G05B 11/40* | (2006.01) | |
| *G05D 3/20* | (2006.01) | |
| *H02P 29/00* | (2016.01) | |
| *G06F 111/10* | (2020.01) | |
| *G06Q 30/06* | (2023.01) | |
| *G06Q 50/04* | (2012.01) | |
| *G06Q 30/0601* | (2023.01) | |

(52) U.S. Cl.
CPC .............. *G06F 30/20* (2020.01); *H02P 29/00* (2013.01); *G06F 2111/10* (2020.01); *G06Q 30/0621* (2013.01); *G06Q 50/04* (2013.01)

(58) Field of Classification Search
CPC .... G06Q 30/0621; G06Q 50/04; G05B 13/04; G05B 11/38; G05B 11/40; G05B 11/36
See application file for complete search history.

(56) References Cited

U.S. PATENT DOCUMENTS

| | | | |
|---|---|---|---|
| 7,072,777 B1 | 7/2006 | Wakui et al. | |
| 8,606,375 B2* | 12/2013 | Gahinet | H04B 17/391 |
| | | | 716/113 |
| 2009/0284208 A1 | 11/2009 | Ikeda et al. | |
| 2012/0053705 A1 | 3/2012 | Bensoussan | |
| 2016/0045385 A1* | 2/2016 | Aguirre-Ollinger | A61H 1/0244 |
| | | | 623/24 |

FOREIGN PATENT DOCUMENTS

| | | | |
|---|---|---|---|
| JP | 2005234952 | 9/2005 | |
| JP | 2008102714 | 5/2008 | |
| JP | 2010230310 | 10/2010 | |
| WO | WO-2005059397 A1 * | 6/2005 | ............ F16F 7/1005 |

OTHER PUBLICATIONS

Goyal et al. "Design and Application of Optimal Feedback Controller for controlling Active Vibrations". International Journal of IT, Engineering and Applied Sciences Research (IJIEASR) ISSN: 2319-4413. vol. 1, No. 1, Oct. 2012. 7 Pages. (Year: 2012).*
López, César Pérez. MATLAB Control Systems Engineering, Sep. 10, 2014, p. 77-143. (Year: 2014).*
Tonoli, Andrea, et al. "A solution for the stabilization of electro-dynamic bearings: Modeling and experimental validation." Journal of vibration and acoustics 133.2 (2011). 10 Pages. (Year: 2011).*
Ciaurriz P, Diaz I, Gil JJ. Stable discrete-time impedances for haptic systems with vibration modes and delay. IEEE Transactions on Control Systems Technology. Jul. 22, 2013;22(3):884-95. (Year: 2013).*
Indian Examination Report for Corresponding Patent Application No. IN 202047029644, dated May 3, 2021—5 pages.
Extended European Search Report for corresponding EP Application No. EP 18 89 1591.2, dated Aug. 11, 2021, 10 pages.
Korean Office Action for corresponding Application No. 10-2020-7020337, dated Mar. 31, 2021—15 pages.
Guillaume Ducard and Hans Peter Geering, "Stability Analysis of a Dynamic Inversion Based Pitch Rate Controller for an Unmanned Aircraft", 2008 IEEE/RSJ International Conference on Intelligent Robots and Systems, Nice, France , 2008—7 pages.
International Search Report for PCT/JP2018/046419 dated Mar. 11, 2019, 2 pages.
Kakino et al., "A Study on the Total Tuning of Feed Drive System in NC Machine Tools (3rd report)—Single Axis Mechanical Parameter Tuning," Journal of the Japan Society for Precision Engineering, vol. 62, No. 3, (1996), pp. 423-427.
Matsubara, "Design and Control of Precision Positioning and Feed Drive systems," Morikita Publishing, 2008.

* cited by examiner

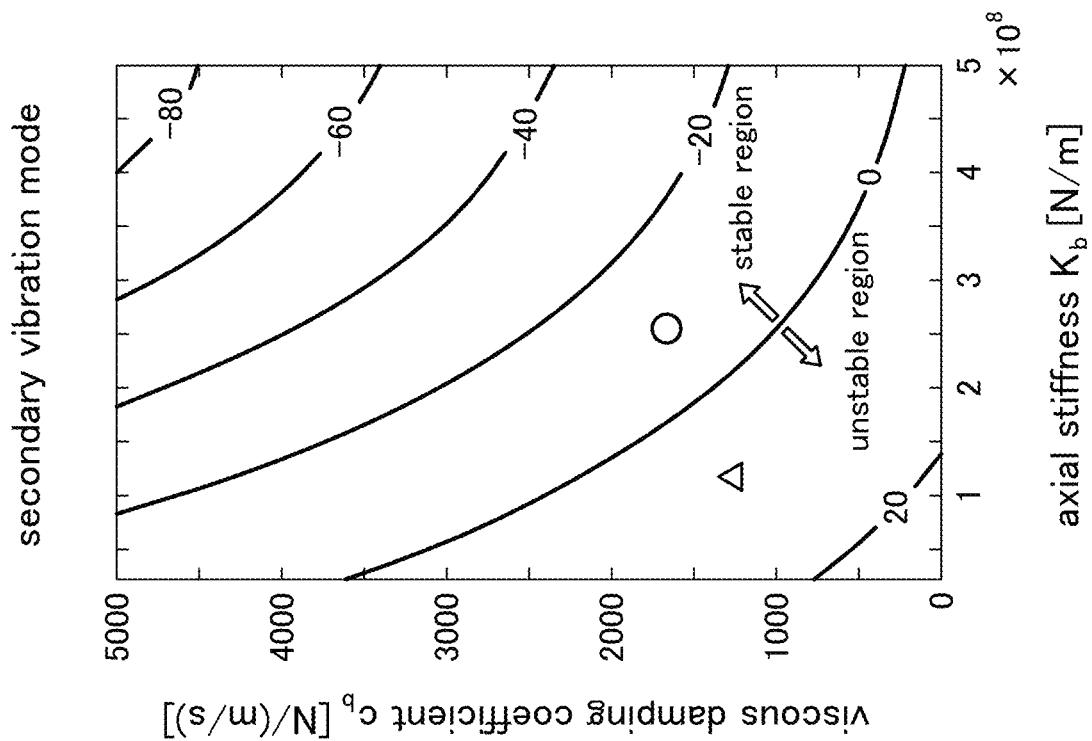
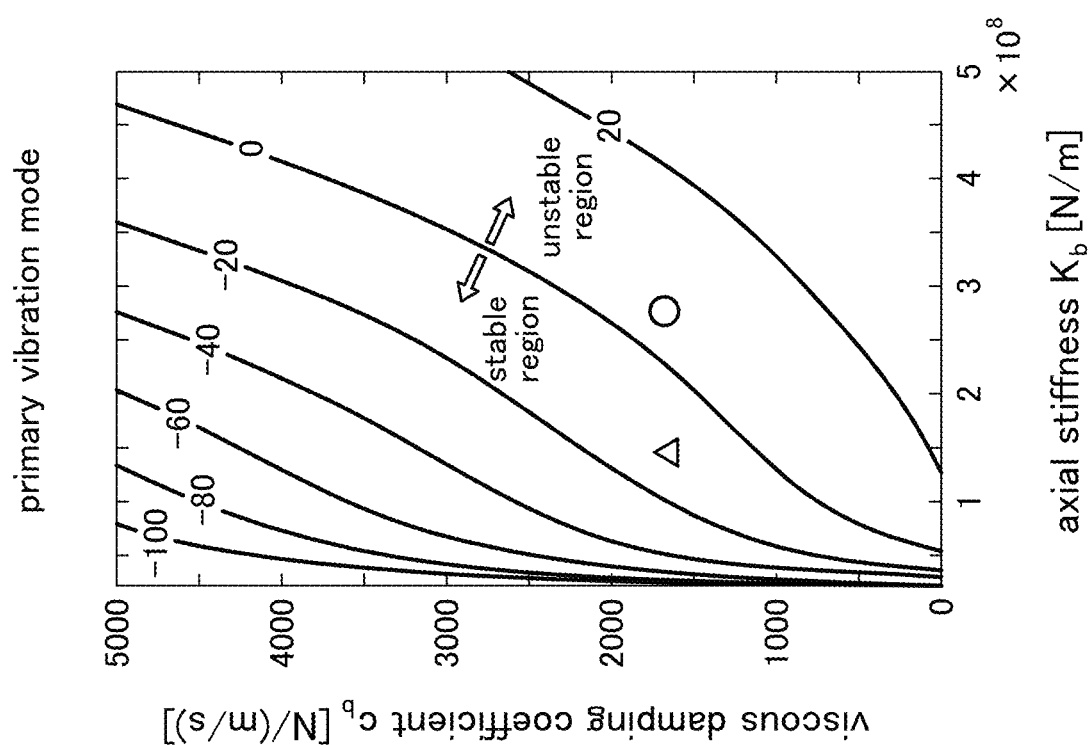
Fig.12A
Fig.12B first support bearing second support bearing first shaft coupling second shaft coupling

DESIGN ASSIST APPARATUS, DESIGN ASSIST METHOD, AND DESIGN ASSIST PROGRAM FOR A MECHANICAL DEVICE DRIVEN BY A FEEDBACK CONTROLLED ELECTRIC MOTOR

CROSS REFERENCE TO RELATED APPLICATIONS

This application is the U.S. National Stage entry of International Application Number PCT/JP2018/046419 filed under the Patent Cooperation Treaty having a filing date of Dec. 17, 2018, which claims priority to Japanese Patent Application No. 2017-242589 having a filing date of Dec. 19, 2017, both of which are incorporated herein by reference.

TECHNICAL FIELD

The present invention relates to a design assist apparatus, a design assist method, and a design assist program configured to support the design of a mechanical device which is driven by a feedback controlled electric motor.

BACKGROUND ART

In a feed drive mechanism that converts the rotational movement of a servomotor controlled by a feedback control system into a linear movement of a table via a ball screw and a nut, for example, it is known that the responsiveness and the precision of the rotational movement of the servomotor increases as the gain constant of the feedback control system is increased. However, it is also known that if the gain constant is excessively large, an incidence of abnormal vibration may occur at a natural frequency (eigenfrequency) which depends on the mass and stiffness of various parts of the feed drive mechanism.

Conventionally, as a technology for determining a suitable property of a control system, it is known to create a root locus diagram according to the characteristics of the corresponding mechanical system. See Non-Patent Document 1. It is also known as a method for improving the general performance of a mechanical device to design the various components thereof by analyzing the relationship between the moment of inertia and the stiffness of the mechanical components, and the servo stiffness which is given as an index of performance of the mechanical device. See Non-Patent Document 2. It is also known to simulate the properties of the mechanical device according to a model thereof for the purpose of assisting the optimum design of the mechanical device. See Patent Document 1.

PRIOR ART DOCUMENT(S)

Patent Document(s)

Patent Document 1: JP2008-102714A

Non-Patent Document(s)

Non-Patent Document 1: "Design and Control of Precision Positioning and Feed Drive systems", Atsushi Matsubara, Morikita Publishing, 2008
Non-Patent Document 2: "A Study on the Total Tuning of Feed Drive System in NC Machine Tools (3rd report)— Single Axis Mechanical Parameter Tuning", Yoshiaki Kakino, Atsushi Matsubara, Daisuke Ueda, Hideo Nakagawa, Torao Takeshita, Hisaichi Maruyama, Journal of the Japan Society for Precision Engineering, Vol. 62, No. 3, (1996), pp. 423-427

SUMMARY OF THE INVENTION

Task to be Accomplished by the Invention

Whereas the ultimate performance of a mechanical device is limited by the characteristics of the mechanical system thereof, the prior art disclosed in Non-Patent Document 1 is related strictly to the control system, and provides no considerations for the mechanical device itself or the mechanical components thereof. The prior art disclosed in Non-Patent Document 2 considers only the first order natural frequency, and fails to provide to the user adequate information on the vibrations that may occur in the mechanical device. The prior art disclosed in Patent Document 1 provides a design that optimizes the servo gain when forming a desired shape by simultaneously actuating a plurality of feed drive mechanisms, but fails to provide a guidance as to how the property of the mechanical system should be designed in order to improve the performance of the mechanical system.

When a user designs (or selects) mechanical components forming a mechanical device, it is desired that the user is enabled to know how the properties of the individual mechanical components affect the generation of abnormal vibrations of the mechanical device. However, the prior art mentioned above fails to address such needs or the conveniences of the user.

In view of such a problem of the prior art, a primary object of the present invention is to provide a design assist apparatus, a design assist method, and a design assist program configured to support the design of a mechanical device driven by a feedback controlled electric motor in such a manner that the user is enabled to easily know how the properties of the mechanical components affect the generation of abnormal vibrations of the mechanical device.

Means to Accomplish the Task

To achieve such an object, a first aspect of the present invention provides a design assist apparatus (1) provided with a processor (11) configured to execute a process of assisting design of a mechanical device (21, 51) driven by a feedback controlled electric motor (23, 57), wherein the processor is configured to set a plurality of parameters of a mathematical model of an analysis target component selected from one or more mechanical components (24, 56, 58) forming the mechanical device, compute a pole of a transfer function of the mechanical device associated with one or more vibration modes of the mechanical device according to the parameters, and create a stability determination diagram including an isoline of a real part of the pole of the transfer function.

Thereby, in designing (or selecting) the mechanical component forming the mechanical device, the user is enabled to readily know how the properties (parameters) of the mechanical component affect the generation of abnormal vibrations of the mechanical device. As a result, the occurrence of abnormal vibration in the mechanical device can be prevented in a preemptive manner, and the user can obtain specific guidelines for improvement regarding the properties of the mechanical component that may be required for suppressing the abnormal vibration which has already occurred in the mechanical device.

According to a second aspect of the present invention, the design assist apparatus further comprises a display unit for displaying the stability determination diagram (41, 71).

Thus, it is possible for the user to easily visually grasp the influence of the characteristics of the mechanical component on the occurrence of abnormal vibration of the mechanical device by using the stability determination diagram displayed on the display unit.

According to a third aspect of the present invention, when the mechanical device has a plurality of vibrations modes, the stability determination diagram created by the processor includes isolines of the real parts of the poles of the transfer function corresponding to the respective vibrations modes.

Thereby, the user can grasp the influence of the characteristics of the mechanical component on the occurrence of the abnormal vibration of the mechanical device in an even more reliable manner by using the stability determination diagram based on the vibration modes displayed on the display unit.

According to a fourth aspect of the present invention, the parameters include those related to stiffness and damping characteristics of the mechanical component.

Thereby, the user can grasp the influence of the characteristics of the mechanical component on the occurrence of the abnormal vibration of the mechanical device in an appropriate manner.

According to a fifth aspect of the present invention, when the poles are arranged in descending order of imaginary parts of the poles of the transfer function, the isolines are generated for the real part of the pole which is lower in the descending order by a difference between a number of freedom of the mathematical model and a number of the vibration modes.

Thereby, the stability determination diagram including isolines of real parts of the poles of the transfer function can be created in an appropriate manner.

According to a sixth aspect of the present invention, the processor is configured to create the stability determination diagram so as to include a marking indicating the parameters of the one or more target products which may be a candidate for the mechanical component.

Thereby, the user is enabled to grasp the influence of the characteristics (parameters) of the target product which is a candidate for the mechanical component on the occurrence of abnormal vibration of the mechanical device in selecting the mechanical component. As a result, the user is enabled to select the mechanical component so as to prevent the occurrence of abnormal vibration in the mechanical device, or to suppress the abnormal vibration which has already occurred in the mechanical device.

A seventh aspect of the present invention provides a design assist method for assisting design of a mechanical device (21, 51) driven by a feedback controlled electric motor (23, 57), comprising the steps of setting a plurality of parameters of a mathematical model of an analysis target component selected from one or more mechanical components (24, 56, 58) forming the mechanical device, computing a pole of a transfer function of the mechanical device associated with one or more vibration modes of the mechanical device according to the parameters, and creating a stability determination diagram including an isoline of a real part of the pole of the transfer function.

Thereby, in designing (or selecting) the mechanical component forming the mechanical device, the user is enabled to readily know how the properties (parameters) of the mechanical component affect the generation of abnormal vibrations of the mechanical device. As a result, the occurrence of abnormal vibration in the mechanical device can be prevented in a preemptive manner, and the user can obtain specific guidelines for improvement regarding the properties of the mechanical component that may be required for suppressing the abnormal vibration which has already occurred in the mechanical device.

An eighth aspect of the present invention provides a design assist program for executing a process for assisting design of a mechanical device (21, 51) driven by a feedback controlled electric motor (23, 57), characterized by causing a computer (1) to execute the procedures of setting a plurality of parameters of a mathematical model of an analysis target component selected from one or more mechanical components (24, 56, 58) forming the mechanical device, computing a pole of a transfer function of the mechanical device associated with one or more vibration modes of the mechanical device according to the parameters, and creating a stability determination diagram including an isoline of a real part of the pole of the transfer function.

Thereby, in designing (or selecting) the mechanical component forming the mechanical device, the user is enabled to readily know how the properties (parameters) of the mechanical component affect the generation of abnormal vibrations of the mechanical device. As a result, the occurrence of abnormal vibration in the mechanical device can be prevented in a preemptive manner, and the user can obtain specific guidelines for improvement regarding the properties of the mechanical component that may be required for suppressing the abnormal vibration which has already occurred in the mechanical device.

Effect of the Invention

As described above, according to the present invention, in the design of a mechanical component constituting a mechanical device driven by an electric motor under feedback control, the user can easily grasp the influences of the characteristics of the mechanical component on the occurrence of abnormal vibration of the mechanical device.

BRIEF DESCRIPTION OF THE DRAWING(S)

FIG. 12 shows graphs associated with examples of stability determination diagrams for a support bearing of the second mechanical device (A: primary vibration mode, B: secondary vibration mode);

DESCRIPTION OF THE PREFERRED EMBODIMENT(S)

The present invention is described in the following in terms of specific embodiment with reference to the appended drawings.

Figure 1:
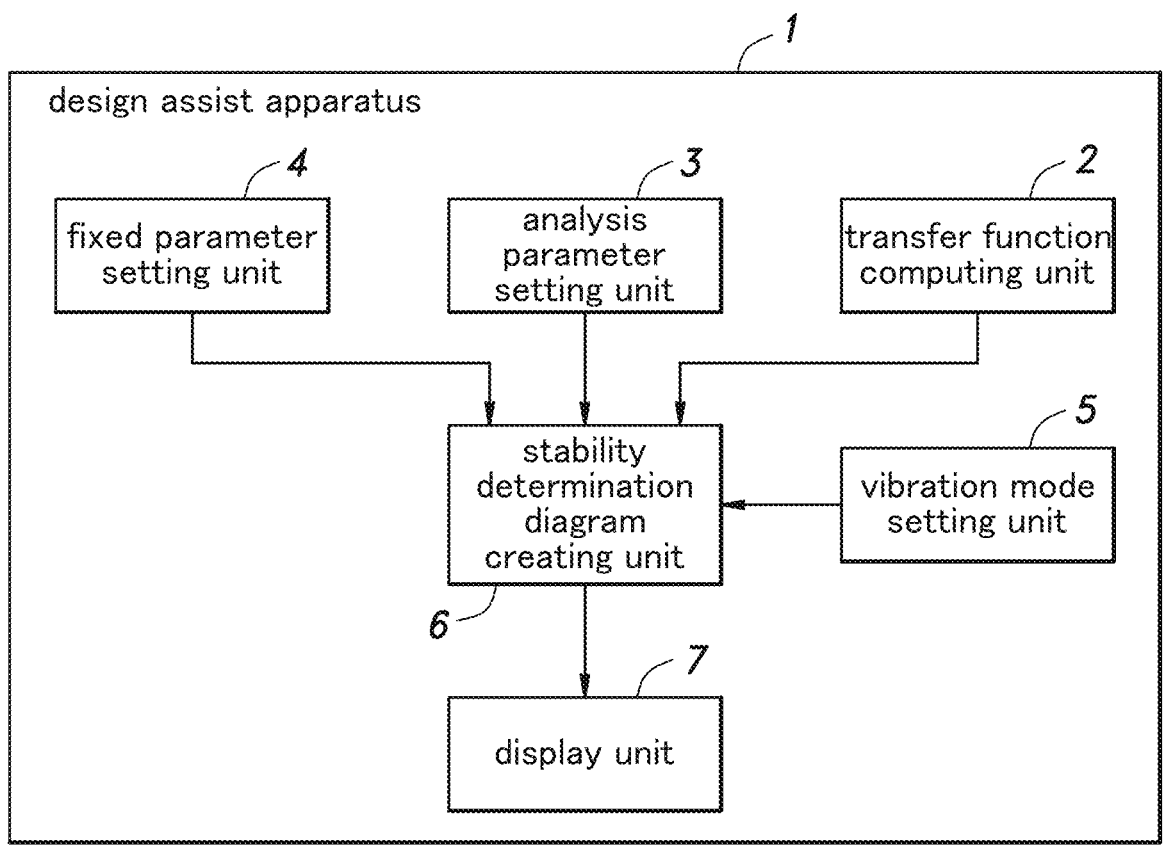
FIG. 1 is a functional block diagram of a design assist apparatus.
Figure 2:
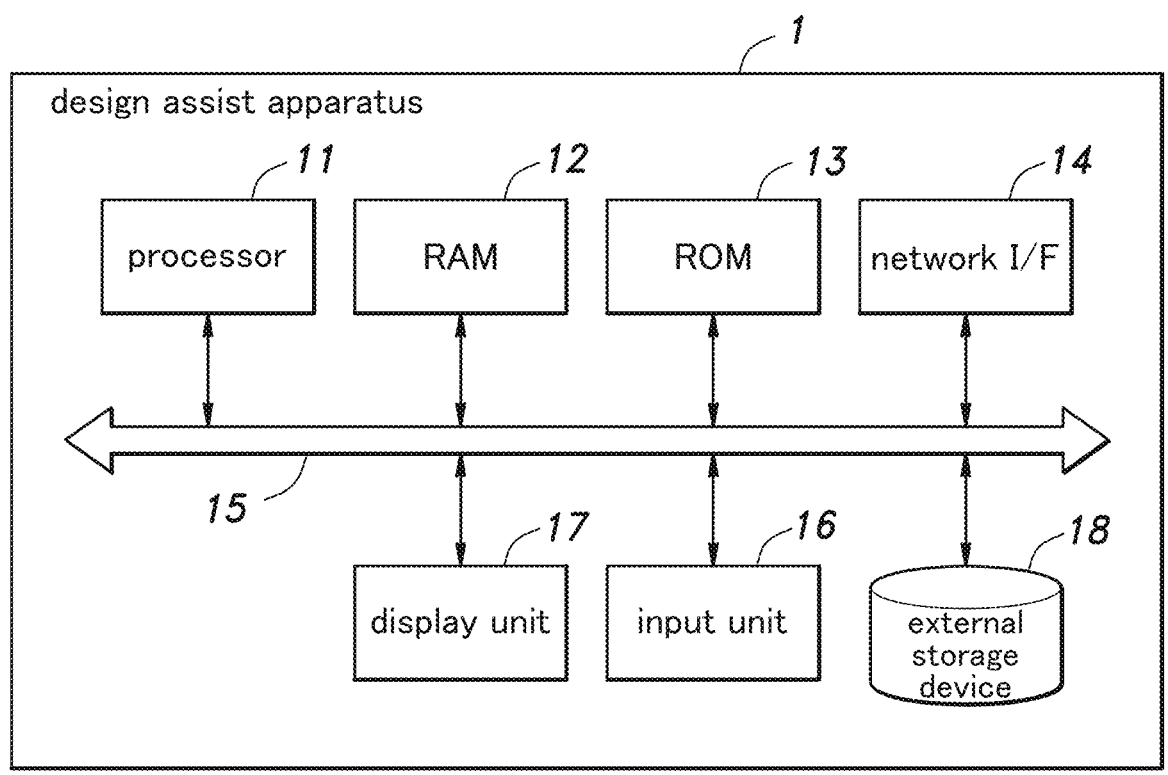
FIG. 2 is a hardware structure diagram of the design assist apparatus.

FIGS. 1 and 2 are a functional block diagram and a hardware structure diagram of a design assist apparatus 1 according to an embodiment of the present invention, respectively.

The design assist apparatus 1 executes a process for assisting design of a mechanical device driven by a motor that is feedback-controlled (hereinafter referred to as "design assist process"), and in particular allows the user to easily grasp the influence of the characteristics (parameters of a mathematical model) of a mechanical component forming the mechanical device on the occurrence of abnormal vibration of the mechanical device in conjunction with the design of the mechanical component (including the selection of the mechanical component).

As shown in FIG. 1, the design assist apparatus 1 essentially consists of a transfer function computing unit 2 that computes a transfer function of the mechanical device (not shown in the drawings) representing the dynamic response characteristics of the mechanical device from a mathematical model consisting of mathematical expressions simulating the characteristics of the mechanical device, an analysis parameter setting unit 3 for setting the range of parameters of the mathematical model of the mechanical component to be analyzed (hereinafter referred to as "analysis target component"), a fixed parameter setting unit 4 for setting parameters of the mathematical models of the mechanical components other than the analysis target component, a vibration mode setting unit 5 for setting the vibration mode of the analysis target component, a stability determination diagram creation unit 6 for computing the poles of the transfer function of the mechanical device, and creating a stability determination diagram including isolines of the real parts of poles in conjunction with one or more vibration modes, and a display unit 7 for accepting the input of various settings (see FIG. 9, for example) by the user and displaying the analysis results such as the stability determination diagram which will be described hereinafter.

The design assist apparatus 1 consists of a computer provided with per se known hardware and, as shown in FIG. 2, includes one or more processors 11 for executing the design assist process according to design assist software (control program), RAM (Random Access Memory) 12 that functions as a work area for the processors 11, ROM (Read Only Memory) 13 that stores control programs executed by the processors 11 and data, and a network interface (I/F) 14 consisting of a network adapter for allowing the connection of the design assist apparatus 1 with a per se known communication network, which are connected to an input/output bus 15.

The design assist apparatus 1 is further provided with peripheral devices such as an input device 16 which may consist of a keyboard and a mouse used by the user to enter various settings in the design assist apparatus 1 in conjunction with the display of analysis results, a display device 17 consisting of an LCD monitor to form the display unit 7, an external storage device 18 consisting of a storage device such as an HDD or a flash memory, and the like. The functions of each unit or device of the design assist apparatus 1 shown in FIG. 1 can be realized by the processors 11 executing a predetermined control program including design assist software.

The hardware of the design assist apparatus 1 is not limited to the one shown in FIG. 2 as long as the design assist process can be executed, and can be changed as appropriate. For example, the design assist apparatus 1 can also be realized by a plurality of computers.

Figure 3:
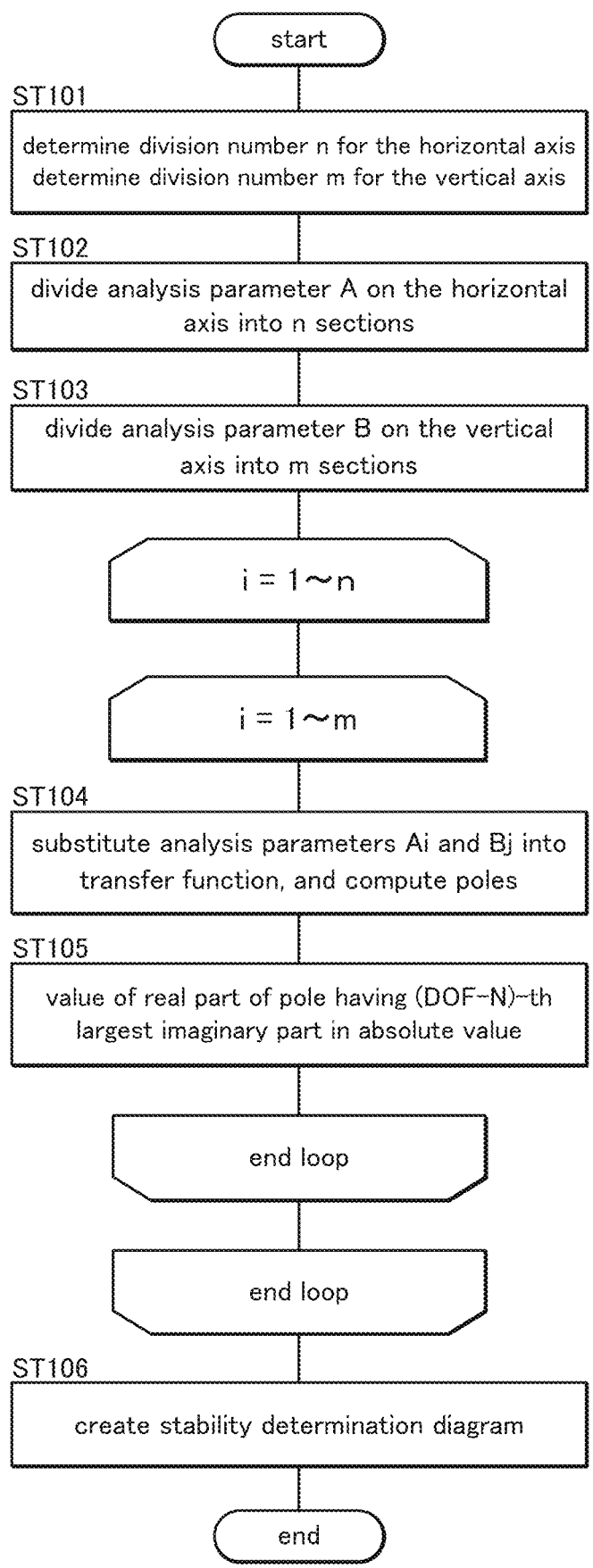
FIG. 3 is a flowchart showing the flow of the design assist process executed by the design assist apparatus.

FIG. 3 is a flowchart showing a flow of the design assist process (design assist method) executed by the design assist apparatus 1 (the stability determination diagram creating unit 6).

In the design assist apparatus 1, the user can select any parameters (two parameters A and B, for instance) of the mathematical model of the mechanical device. These parameters are indicated on the horizontal axis and the vertical axis of the stability determination diagram (see FIG. 7 which will be described hereinafter), respectively.

Upon starting of the design assist process, the numbers n and m by which the horizontal axis and the vertical axis are divided, respectively, are selected by the user (ST101) with the result that the analysis range of parameter A is divided into n increments (ST102), and the analysis range of parameter B is divided into m increments (ST103). The division of the horizontal axis and the vertical axis may be performed either linearly or logarithmically. Further, the user does not necessarily have to set the division numbers n and m each time, and the division numbers n and m stored in the external storage device 18 or the like in advance can also be used. Here, if the number of division is large, analysis can be performed with a higher resolution, but the amount of computation load increases. Therefore, the ranges of the numbers of division of the horizontal axis and the vertical axis may be predetermined in advance (by setting upper limit values and/or lower limit values, for example).

The parameters $A_i$ (i=1 to n) and $B_j$ (j=1 to m) to be analyzed (in other words, values of the parameters A and B that are varied according to the respective division numbers n and m) are substituted into the transfer function, and the poles are sequentially computed (ST104). At this time, the poles of the transfer function can be obtained as the roots of the denominator polynomial of the transfer function.

Here, assuming that the degree of freedom of the mechanical device model is DOF, the number of vibration modes of the mechanical device is (DOF−1). The absolute value of the imaginary part of each pole determined in step ST104 corresponds to the vibration frequency of the pole. When the N-th order vibration mode is to be analyzed, the absolute value of the real part of the pole having the (DOF−N)-th largest absolute value of the imaginary part is stored in the external storage device as Cij (ST105). Thus, where the N-th vibration mode is to be analyzed, among the poles determined in step ST104, the one whose absolute value of the imaginary part is the (DOF−N)-th largest corresponds to the N-th vibration mode. The real part of each pole of the transfer function is related to the stability of the mechanical machine. The mechanical device is stable if the value of the real part is negative, and unstable if the value of the real part is positive.

Then, by computing isolines on a graph having A along the horizontal axis and B along the vertical axis in regard to the value Cij of the real part obtained in step ST105, a stability determination diagram (graph data containing isolines) including the isolines can be created (ST106). The created stability determination diagram is stored in the external storage device 18. The stability determination diagram may be a three-dimensional graph based on the parameters Ai and Bj and the value Cij of the real part.

As will be described hereinafter, in the design of the mechanical components (including the selection of the mechanical components) that constitute the mechanical device, the user can refer to the above-described stability determination diagram. The user may refer to the stability determination diagram preferably via the display of a design assist screen including the stability determination diagram on the display device 17. However, the present invention is not limited to this, and other forms (for example, speech output on the stability determination diagram) may also be used for this purpose.

Thus, the user can easily grasp the influence of the characteristics (parameters) of each mechanical component on the occurrence of abnormal vibration of the mechanical device. As a result, the user is enabled to prevent the occurrence of abnormal vibration in a newly designed mechanical device in advance, and, in addition, to obtain specific improvement guidance in suppressing the occurrence of vibration in the existing mechanical device if such abnormal vibration is occurring.

A design assist apparatus 1 and a design assist method according to a preferred embodiment of the present invention are described in the following.

Figure 4:
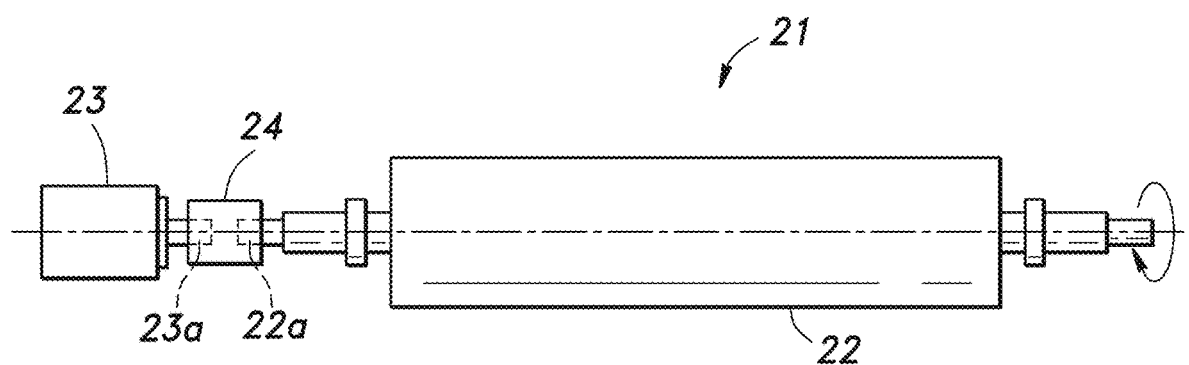
FIG. 4 is a view showing a first mechanical device given as an example of application of the design assist process.
Figure 5:
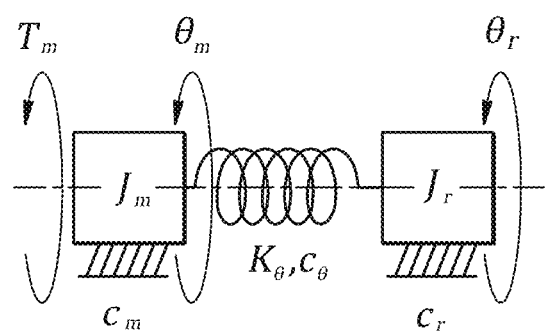
FIG. 5 is a mechanical model of the first mechanical device.
Figure 6:
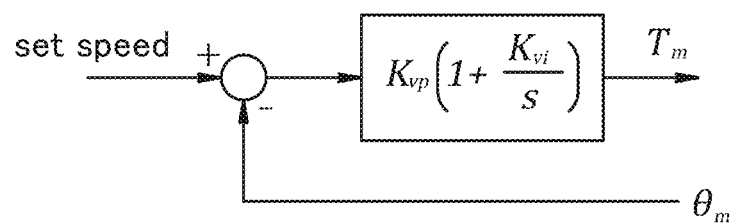
FIG. 6 is a block diagram of the control system for the electric motor of the first mechanical device.

FIG. 4 is a view showing a first mechanical device 21 as an example of application of the design assist process by the design assist apparatus 1, and FIG. 5 is a view showing a mechanical model of the first mechanical device 21. FIG. 6 is a block diagram of a control system for an electric motor 23 used in the first mechanical device 21.

As shown in FIG. 4, the mechanical device 21 is configured as a rotational drive mechanism of a roller 22 in a printing machine, and is provided with an electric motor 23 for driving the roller 22, and a shaft coupling 24 that connects a shaft 22a extending from one end of the roller 22 with an output shaft 23a of the electric motor 23. In this case, the analysis target component for the design assist apparatus 1 is the shaft coupling 24. The performance of the drive mechanism can be improved by appropriately designing the stiffness and damping characteristics of the shaft coupling 24.

The mechanical model shown in FIG. 5 represents the mechanical characteristics of the rotational drive mechanism of the mechanical device 21. The rotational speed of the electric motor 23 is feedback controlled as shown in the block diagram of the control system shown in FIG. 6. Here, Tm is the output torque of the electric motor 23, Om is the rotational angle of the electric motor 23, and Or is the rotational angle of the roller 22. Table 1 shows the parameters shown in FIGS. 5 and 6 together with numerical examples used for the analysis.

TABLE 1

| | parameters | value | unit |
|---|---|---|---|
| $J_m$ | moment of inertia of motor | 0.0224 | $kgm^2$ |
| $J_r$ | moment of inertia of roller | 0.638 | $kgm^2$ |
| $K_\theta$ | motor-roller torsional stiffness | $4.5 \times 10^5$ | Nm/rad |
| $c_m$ | viscous friction coefficient of motor | $5 \times 10^{-4}$ | Nm/(rad/s) |
| $c_r$ | viscous friction coefficient of roller | $2 \times 10^{-3}$ | Nm/(rad/s) |
| $c_\theta$ | motor-roller viscous damping coefficient | 8 | Nm/(rad/s) |
| $K_{vp}$ | velocity loop proportional gain | 70 | — |
| $K_{vi}$ | velocity loop integral gain | 20 | — |

From the mechanical model shown in FIG. 5, the following equation of motion is obtained, and from this equation of motion and the block diagram shown in FIG. 6, the transfer function of the entire mechanical device 21 can be computed based on a per se known method.

$$\begin{cases} J_m\ddot{\theta}_m + c_m\dot{\theta}_m + c_\theta(\dot{\theta}_m - \dot{\theta}_r) + K_\theta(\theta_m - \theta_r) = T_m \\ J_r\ddot{\theta}_r + c_r\dot{\theta}_r + c_\theta\{\dot{\theta}_r - \dot{\theta}_m\} + K_\theta\{\theta_r - \theta_m\} = 0 \end{cases} \quad \text{[Equation 2]}$$

Figure 7:
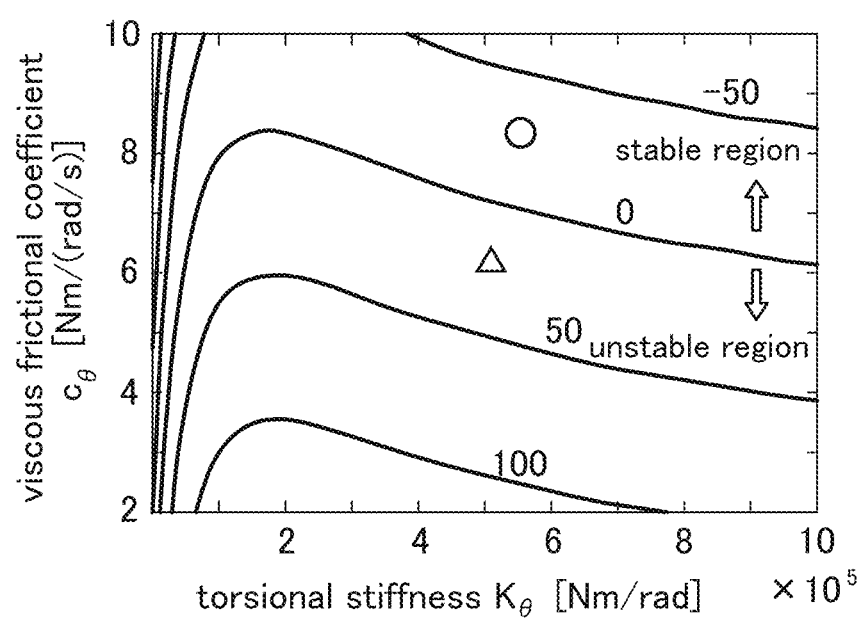
FIG. 7 is an example of stability determination diagram for a shaft coupling of the first mechanical device.
Figure 8A:
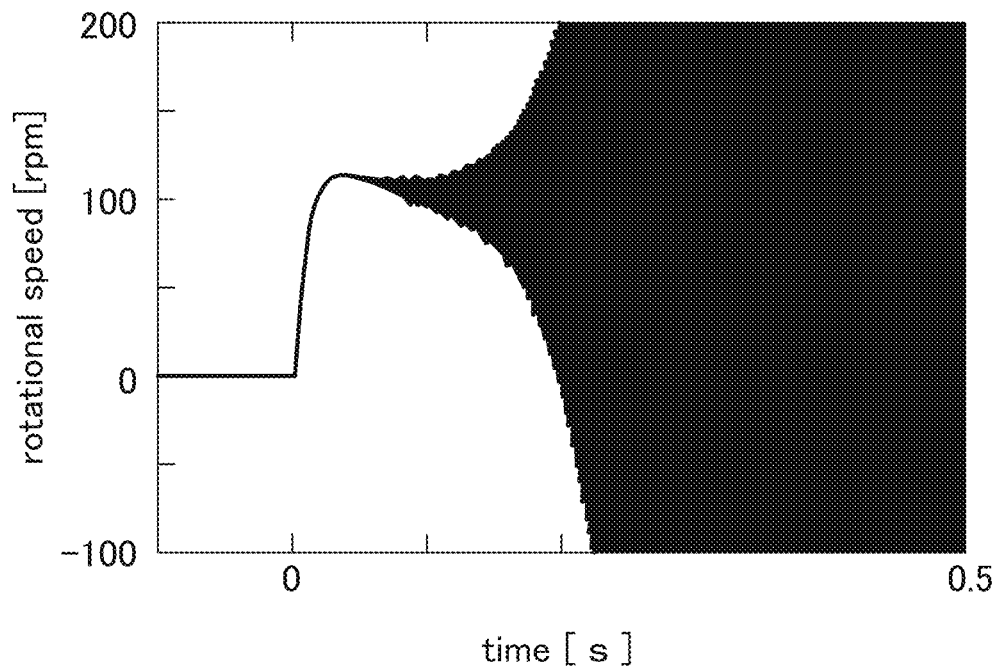
FIG. 8 show graphs showing changes in the rotational speed in target products given as candidates for the shaft coupling of the first mechanical device (A: first shaft coupling, B: second shaft coupling)
Figure 8B:
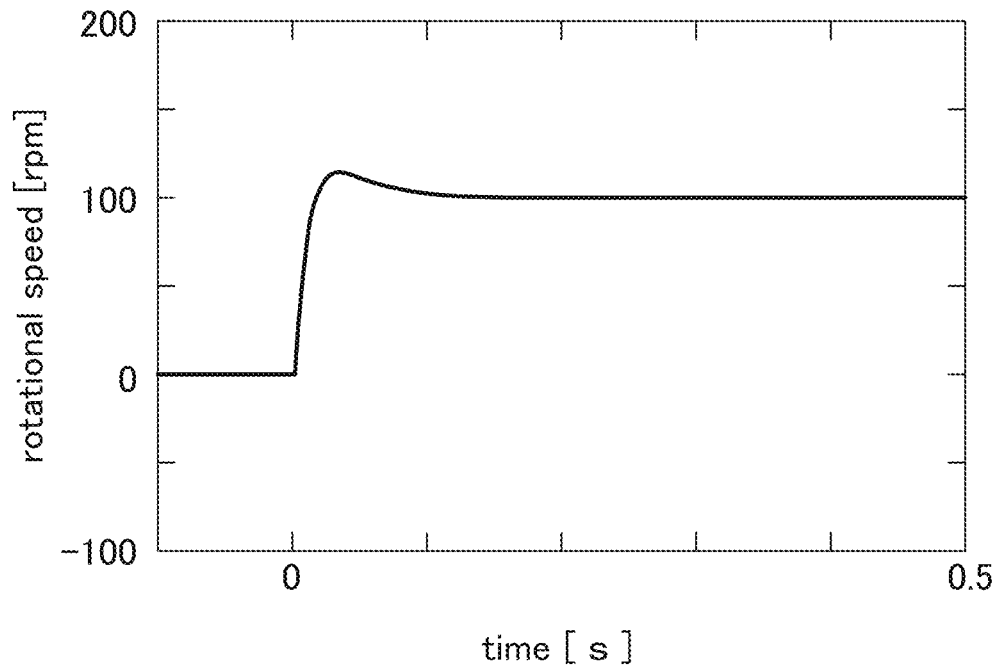

FIG. 7 is a graph showing an example of a stability determination diagram regarding the shaft coupling 24 of the first mechanical device 21 shown in FIG. 4 and FIGS. 8A and 8B show changes in the rotational speed when a target product (which may be a first shaft coupling or second shaft coupling) given as examples of the coupling 24 of the first mechanical device 21.

In the stability determination diagram shown in FIG. 7, the stiffness and damping characteristics (torsional stiffness and motor-roller viscous friction coefficient) of the shaft coupling 24 are used as parameters, and are shown along the horizontal axis and the vertical axis, respectively. The numerical values (here, −50, 0, 50, 100) associated with the respective isolines in FIG. 7 are the values of the real part of the transfer function regarding the secondary vibration mode of the mechanical device 21. In this example, except in the region where the torsional stiffness is relatively small (a region where the torsional stiffness is less than $2.0 \times 10^5$, for example), abnormal vibration is not likely to be generated in the mechanical device 21 in the stable region where the value of the real part of the transfer function is negative, whereas the possibility of occurrence of abnormal vibration in the mechanical device 21 is high in the unstable region where the value of the real part is positive. The stability determination diagram is not limited to that shown in FIG. 7, and the horizontal axis and the vertical axis shown in FIG. 7 may be interchanged with each other, for example.

FIGS. 8A and 8B show changes in the rotational speed of the roller 22 when the rotational speed of the motor 23 is increased from zero to 100 rpm in the mechanical device 21 to which the first and second shaft couplings are applied as the shaft coupling 24, respectively.

Here, the values of the stiffness and damping characteristics of the first coupling are located in the unstable region of the stability determination diagram, as indicated by a triangle (Δ) in FIG. 7. On the other hand, the values of the torsional stiffness and the viscous damping characteristics of the second coupling are located in the stable region of the stability determination diagram, as indicated by a circle (○) in FIG. 7. The "target product" used in the present invention can be selected from existing products such as commercial products, but may additionally be a mechanical component which is planned to be newly designed and manufactured.

As shown in FIG. 8A, when the first shaft coupling having the values of stiffness and damping characteristics that are located in the unstable region is applied to the mechanical device 21, abnormal vibration occurs as the roller 22 rotates. It can be understood that the normal use of the mechanical device 21 is difficult. On the other hand, as shown in FIG. 8B, when the second coupling having the values of stiffness and damping characteristics that are located in the stable region is applied to the mechanical device 21, the roller 22 of the mechanical device 21 can rotate in a normal manner.

Thus, the user can easily grasp the influence of the characteristics of the shaft coupling 24 (the stiffness and damping characteristics, in this case) on the vibration of the mechanical device 21 from the above-described stability determination diagram. As a result, the user can prevent abnormal vibration from occurring in the mechanical device 21 by designing (including selecting) the shaft coupling 24 so that the values of the stiffness and the damping characteristic are located in the stable region. In addition, when abnormal vibration should occur in the mechanical device 21, the user can obtain specific improvement guidelines on the stiffness and damping characteristics of the shaft coupling 24 for suppressing the generation of the vibration. By using the present invention, it is possible to display a guideline for ensuring a stable operation of a mechanical component such as a shaft coupling in such a manner as to allow the user to readily make necessary decisions. Therefore, a highly advantageous effect can be achieved.

Figure 9:
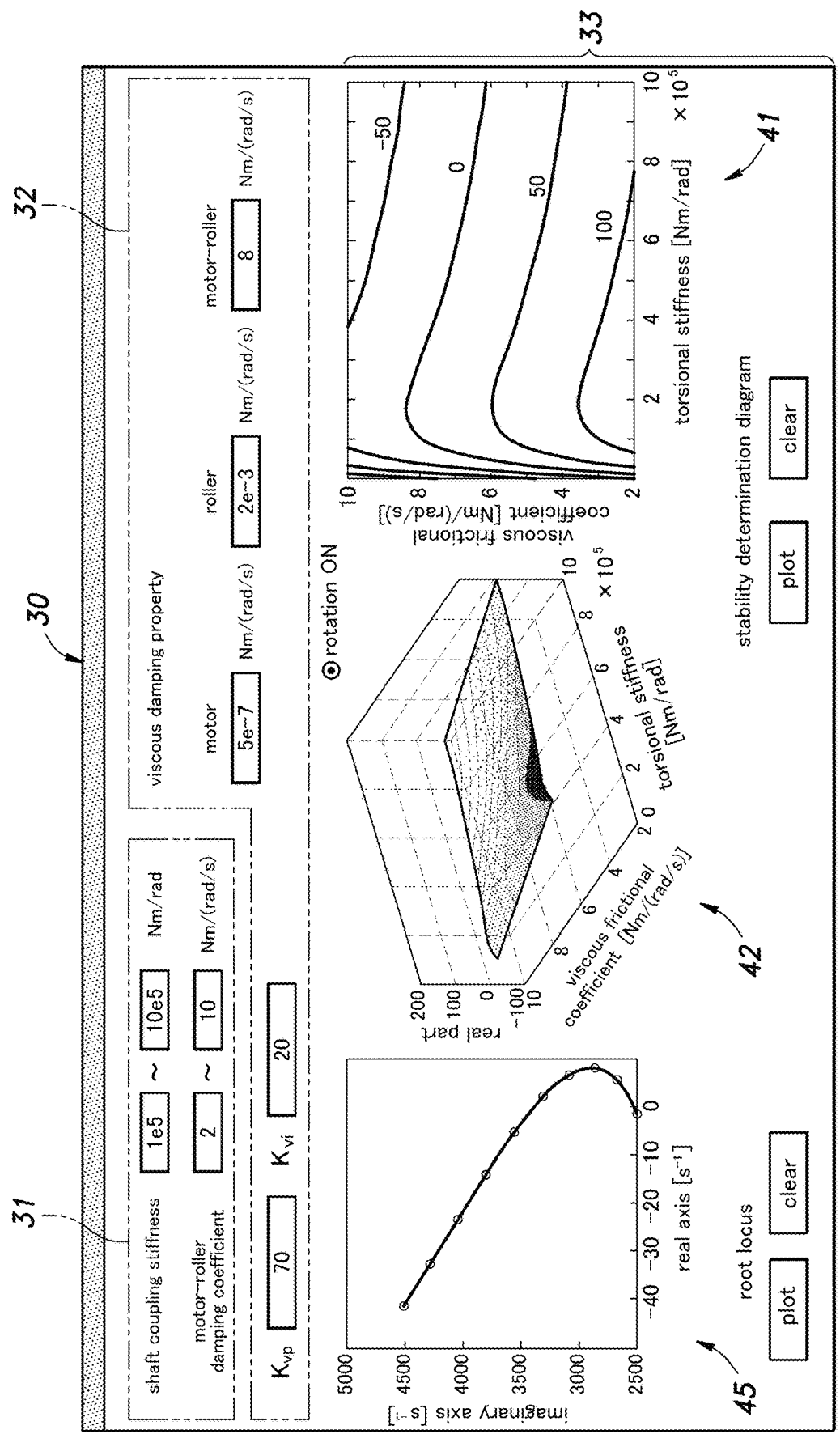
FIG. 9 is a view of an example of a GUI screen generated by design assist software executed by the design assist apparatus in connection with the design of the first mechanical device.

FIG. 9 is a view showing an example of a GUI (Graphical User Interface) screen 30 created by the design assist software installed in the design assist apparatus 1 in conjunction with the design assist operation for the first mechanical device 21.

As shown in FIG. 9, the GUI screen 30 includes an analysis parameter setting field 31 that enables input operation by the user for selecting the range of parameters of the analysis target component (here, the stiffness and damping characteristics of the coupling 24, etc.) set by the analysis parameter setting unit 3. A fixed parameter setting field 32 enables input operation by the user for selecting the parameters (such as a velocity loop proportional gain Kvp, a velocity loop integral gain Kvi, a viscous friction coefficient of the electric motor, a viscous friction coefficient of roller, a motor-roller viscous damping coefficient, etc.) of mechanical components other than the analysis target component which are set by the fixed parameter setting unit 4. Further, an analysis result output field 33 displays a stability determination diagram 41 corresponding to the diagram shown in FIG. 7, and a three-dimensional graph 42 thereof according to a prescribed operation by the user. The three-dimensional graph 42 can be displayed from any desired viewpoint by checking "rotation ON" on the GUI screen. The display of "rotation ON" may be omitted so that rotation may be possible at all times, or the viewpoint may be fixed.

Figure 17:
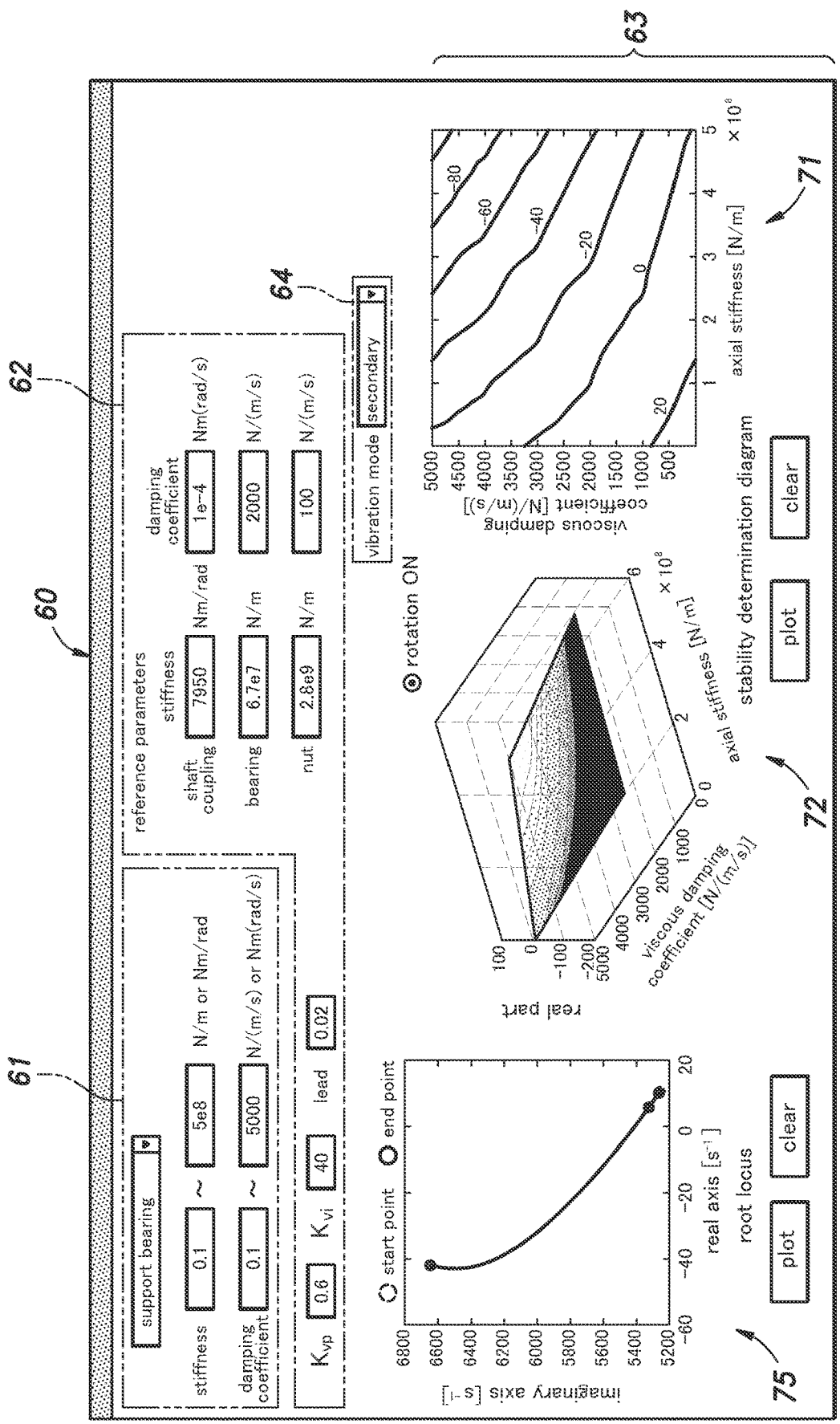
FIG. 17 is a view of an example of a GUI screen generated by design assist software executed by the design assist apparatus in connection with the design of the second mechanical device.

The above-described transfer function computation unit 2 is a part of the function of the design assist software, and, those of the parameters of the mechanical components which are not required to be changed are stored in the external storage device 18 in advance as data belonging to the design assist software. In this particular case, since the vibration mode of the mechanical device 21 is one, a vibration mode setting field as shown in FIG. 17 which will be described hereinafter is not necessary, and the above-described vibration mode setting unit 5 may be omitted.

In the design assist apparatus 1, by using this GUI screen 40, input of various settings by the user can be made, and output (such as a stability determination diagram) of an analysis result to the user can also be made. As such an output of an analysis result, the analysis result output field 33 may display a root locus diagram 45 created from the parameters of the shaft coupling 24 by using a per se known method.

Figure 10:
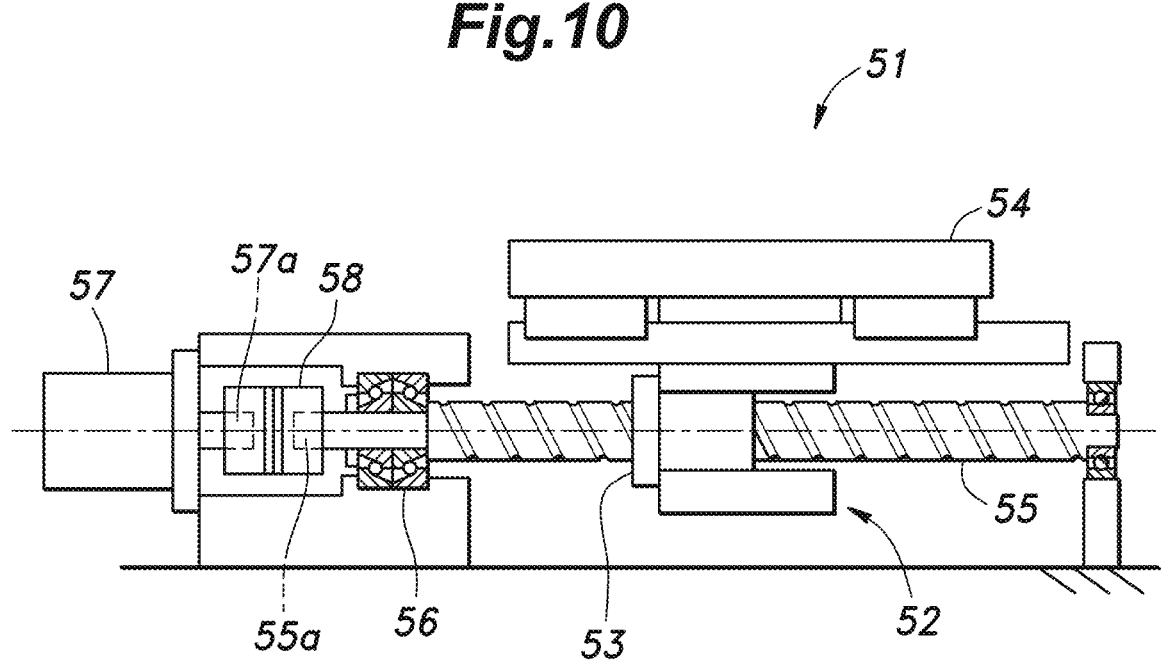
FIG. 10 is a view showing a second mechanical device given as an example of application of the design assist process.
Figure 11:
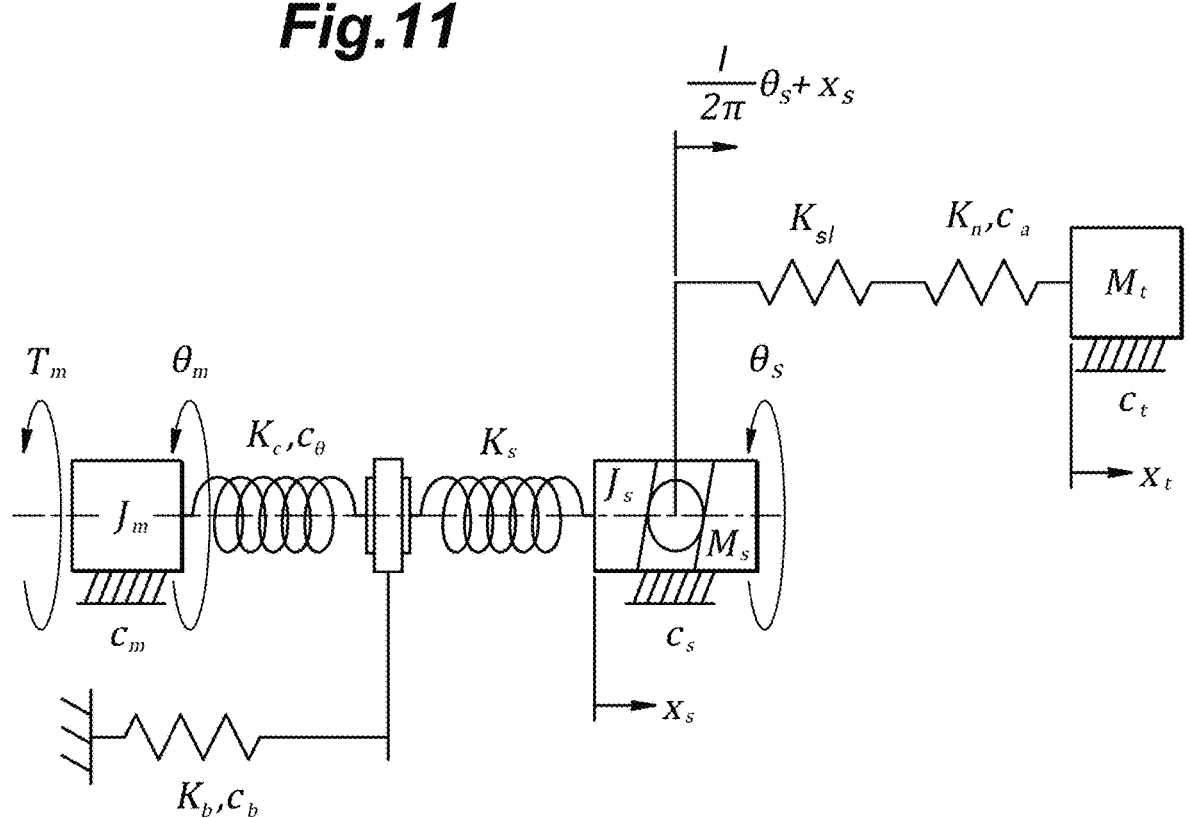
FIG. 11 is a diagram showing a mechanical model of the second mechanical device.

FIG. 10 is a view showing a second mechanical device 51 given as another example of the application of the design assist process by the design assist apparatus 1, and FIG. 11 is a view showing a mechanical model of the mechanical device 51. In regard to the second mechanical device 51, reference should be made to the above description of the first mechanical device 21 for matters that are not particularly mentioned in the following.

As shown in FIG. 10, the mechanical device 51 is configured as a feed drive mechanism of a manufacturing apparatus (for example, a machine tool), and includes a ball screw 52, a table 54 attached to a nut 53 of the ball screw 52, a support bearing supporting a screw shaft 55 of the ball screw 52, a servomotor 57 for driving the ball screw 52, and a shaft coupling 58 connecting an end 55a of the screw shaft 55 with an output shaft 57a of the servomotor 57. By using this configuration, the mechanical device 51 is enabled to convert the rotational movement of the servomotor 57 into a linear movement of the table 54 via the screw shaft 55 and the nut 53. Here, the components to be analyzed by the design assist apparatus 1 are the shaft coupling 58 and the support bearing 56. The performance of the feed drive mechanism of this mechanical device 51 can be improved by appropriately designing the stiffness and damping characteristics of the shaft coupling 58 and the support bearing 56.

The mechanical model shown in FIG. 11 represents mechanical characteristics of the drive mechanism of the mechanical device 21. In FIG. 11, Tm is the output torque of the servomotor 57, θm is the rotational angle of the servomotor 57, θs is the rotational angle of the screw shaft 55, xs is the axial displacement of the screw shaft 55, xt is the axial displacement of the table 54. Table 2 shows the parameters shown in FIG. 11 together with numerical examples used for the analysis.

TABLE 2

| | parameters | value | unit |
|---|---|---|---|
| $J_m$ | moment of inertia of motor | $3.33 \times 10^{-4}$ | kgm² |
| $J_s$ | moment of inertia of ball screw | $2.32 \times 10^{-4}$ | kgm² |
| $M_t$ | mass of table | 21.54 | kg |
| $M_s$ | mass of ball screw | 2.89 | kg |
| $K_c$ | torsional stiffness of shaft coupling | 7950 | Nm/rad |
| $K_s$ | torsional stiffness of support bearing | 8869 | Nm/rad |
| $K_b$ | axial stiffness of support bearing | $6.7 \times 10^7$ | N/m |
| $K_{sl}$ | axial stiffness of ball screw | $2.05 \times 10^8$ | N/m |
| $K_n$ | axial stiffness of nut | $2.8 \times 10^9$ | N/m |
| $c_m$ | viscous friction coefficient of motor | $4.34 \times 10^{-4}$ | Nm/(rad/s) |
| $c_s$ | viscous friction coefficient of ball screw | $1.69 \times 10^{-3}$ | Nm/(rad/s) |

TABLE 2-continued

| parameters | | value | unit |
|---|---|---|---|
| $c_t$ | viscous friction coefficient of linear guide | 50 | N/(m/s) |
| $c_b$ | viscous friction coefficient in support bearing | 2000 | N/(m/s) |
| $c_\theta$ | motor-ball screw viscous damping coefficient | $1 \times 10^{-4}$ | Nm/(rad/s) |
| $c_a$ | ball screw-table viscous damping coefficient | 100 | N/(m/s) |
| $K_{vp}$ | velocity loop proportional gain | 0.6 | — |
| $K_{vi}$ | velocity loop integral gain | 40 | — |

The equation of motion given below is obtained from the mechanical model shown in FIG. 11, and the transfer function of the entire mechanical device 51 can be computed based on the equation of motion and a block diagram similar to that shown in FIG. 6.

[Equation 2]

$$\begin{cases} J_m \ddot{\theta}_m + c_m \dot{\theta}_m + c_\theta(\dot{\theta}_m - \dot{\theta}_s) + f_m + \left(\frac{K_c K_s}{K_c + K_s}\right)(\theta_m - \theta_s) = T_m \\ J_s \ddot{\theta}_s + c_s \dot{\theta}_s + c_\theta(\dot{\theta}_s - \dot{\theta}_m) + \frac{l}{2\pi} c_a \left\{\left(\frac{l}{2\pi}\dot{\theta}_s + \dot{x}_s\right) - \dot{x}_t\right\} + f_s + \\ \quad \left(\frac{K_c K_s}{K_c + K_s}\right)(\theta_s - \theta_m) + \frac{l}{2\pi} K_a \left\{\left(\frac{l}{2\pi}\theta_s + x_s\right) - x_t\right\} = 0 \\ M_s \ddot{x}_s + c_b \dot{x}_s + K_b x_s + c_a \left\{\left(\frac{l}{2\pi}\dot{\theta}_s + \dot{x}_s\right) - \dot{x}_t\right\} + K_a \left\{\left(\frac{l}{2\pi}\theta_s + x_s\right) - x_t\right\} = 0 \\ M_t \ddot{x}_t + c_t \dot{x}_t + c_a \left\{\dot{x}_t - \left(\frac{l}{2\pi}\dot{\theta}_s + \dot{x}_s\right)\right\} + f_t + K_a \left\{x_t - \left(\frac{l}{2\pi}\theta_s + x_s\right)\right\} = 0 \end{cases}$$

Figure 13A:
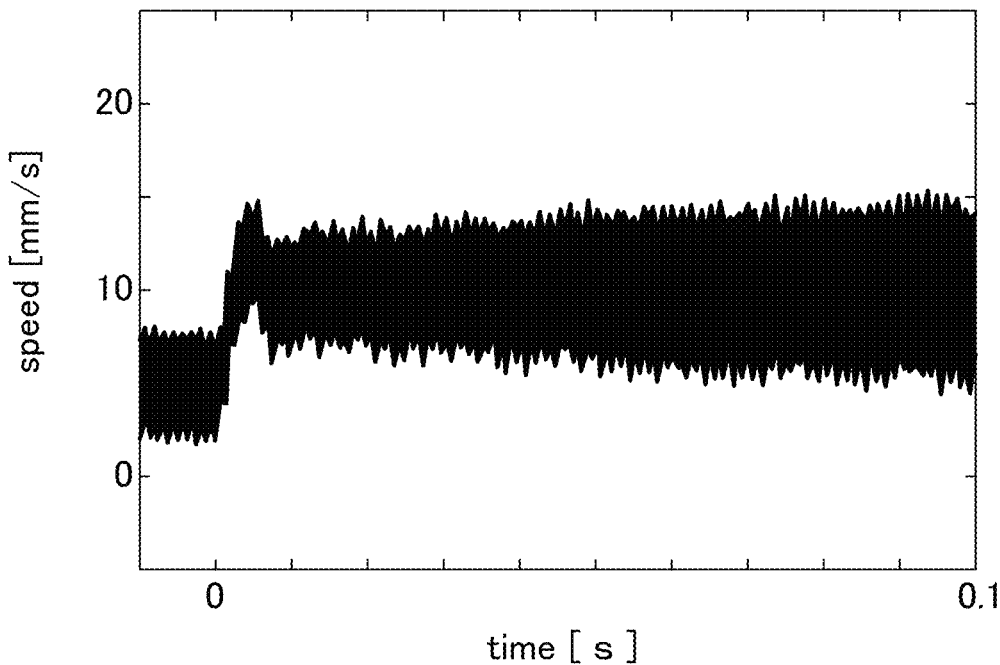
FIG. 13 shows graphs showing changes in the rotational speed when target products given as candidates for the support bearing of the second mechanical device (A: first support bearing, B: second support bearing)
Figure 13B:
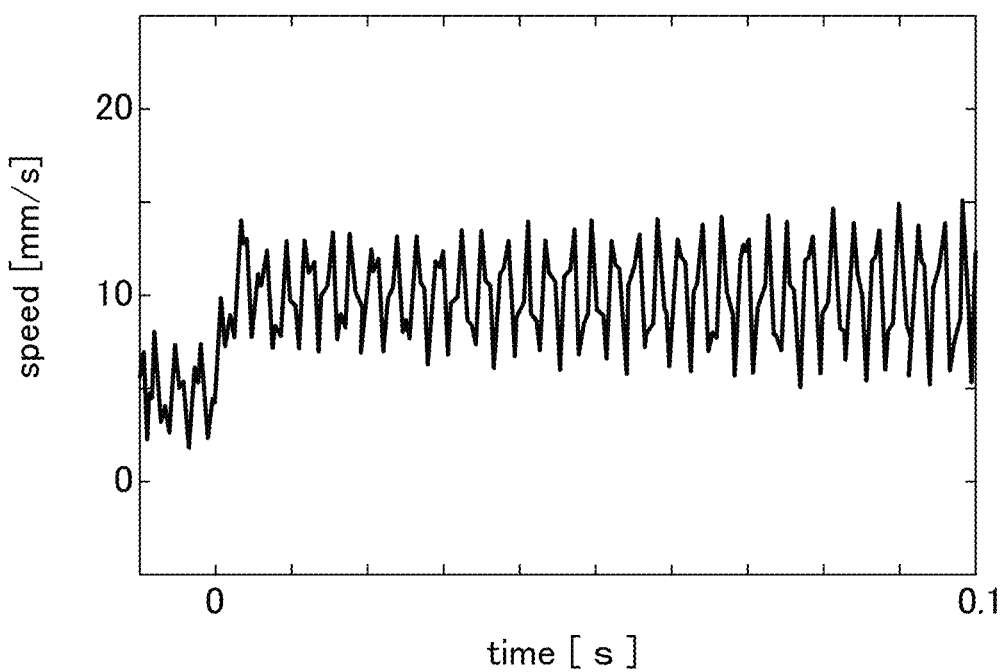

FIGS. 12A and 12B are stability determination diagrams regarding the primary vibration mode and the secondary vibration mode of the support bearing 56 which is one of the mechanical components of the second mechanical device 51 shown in FIG. 10, respectively. FIGS. 13A and 13B show the changes in the speed in cases where target products (first and second support bearings) that are candidates for the support bearing 56 of the second mechanical device 51 are used.

In the stability determination diagrams shown in FIGS. 12A and 12B, the stiffness and damping characteristics (axial stiffness and axial viscous damping coefficient) of the support bearing 56 are used as parameters, and are indicated along the horizontal axis and the vertical axis, respectively. Since the mechanical model of the mechanical device 51 shown in FIG. 11 has four degrees of freedom, the number of vibration modes is three. Here, the stability determination diagram is shown in regards to only two of the vibration modes (the primary vibration mode shown in FIG. 12A, and the secondary vibration mode shown in FIG. 12B).

As in the case of FIG. 7 described above, in regard to FIGS. 12A and 12B, the possibility of abnormal vibration occurring in the mechanical device 51 is low in the stable region where the value of the real part of the transfer function is negative. On the other hand, there is a high possibility that abnormal vibration occurs in the mechanical device 51 in the unstable region where the value of the real part is positive.

FIGS. 13A and 13B show the response (speed change) of the mechanical device 51 to which the first and second support bearings are applied as the support bearing 56, respectively, when the speed command of the servomotor 57 is changed in a stepwise manner.

Here, the values of the axial stiffness and the axial viscous damping coefficient of the first support bearing are indicated by a triangle mark (Δ) in FIGS. 12A and 12B, and are located in the stable region for the primary vibration mode shown in FIG. 12A, but are located in the unstable region for the secondary vibration mode shown in FIG. 12B. Also, the values of the axial stiffness and the axial viscous damping coefficient of the second support bearing are shown by a circle mark (○) in FIGS. 12A and 12B, and, contrary to the first support bearing, are located in the unstable region for the primary vibration mode shown in FIG. 12A, but in the stable region for the secondary vibration mode shown in FIG. 12B.

In the case of the first support bearing shown in FIG. 13A, vibration occurs at a higher frequency than in the case of the second support bearing shown in FIG. 13B. This corresponds to the fact that the values of the axial stiffness and the axial viscous damping coefficient of the first support bearing are located in the unstable region in the stability determination diagram shown in FIG. 12B.

Thus, by using the stability determination diagrams shown in FIGS. 12A and 12B, the user can easily grasp the influence of the characteristics of the support bearing 56 (here, the axial stiffness and the viscous damping coefficient in the axial direction) of the mechanical device 51 on the vibration of the mechanical device 51 in the primary vibration mode and the secondary vibration mode. Thus, according to the present invention, the stability of the mechanical component of a mechanical device having two or more vibration modes can be easily determined not only after manufacture of the mechanical device but also at the time of designing the mechanical device.

Figure 14B:
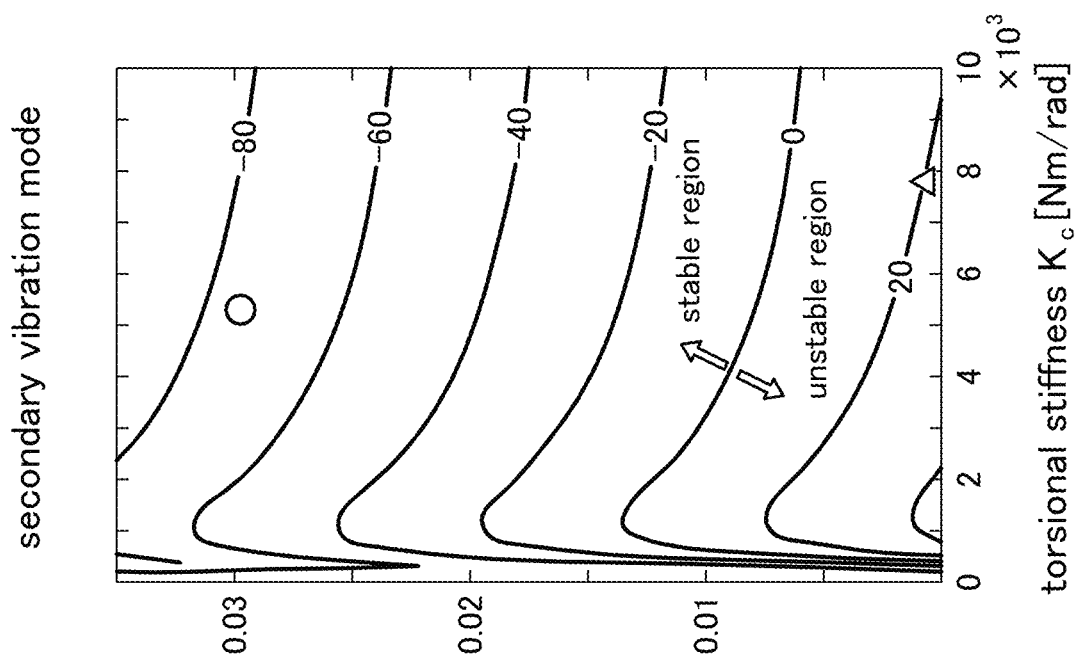
FIG. 14 shows diagrams showing examples of stability determination diagrams for the shaft coupling of the second mechanical device (A: first order vibration mode, B: second order vibration mode)
Figure 14A:
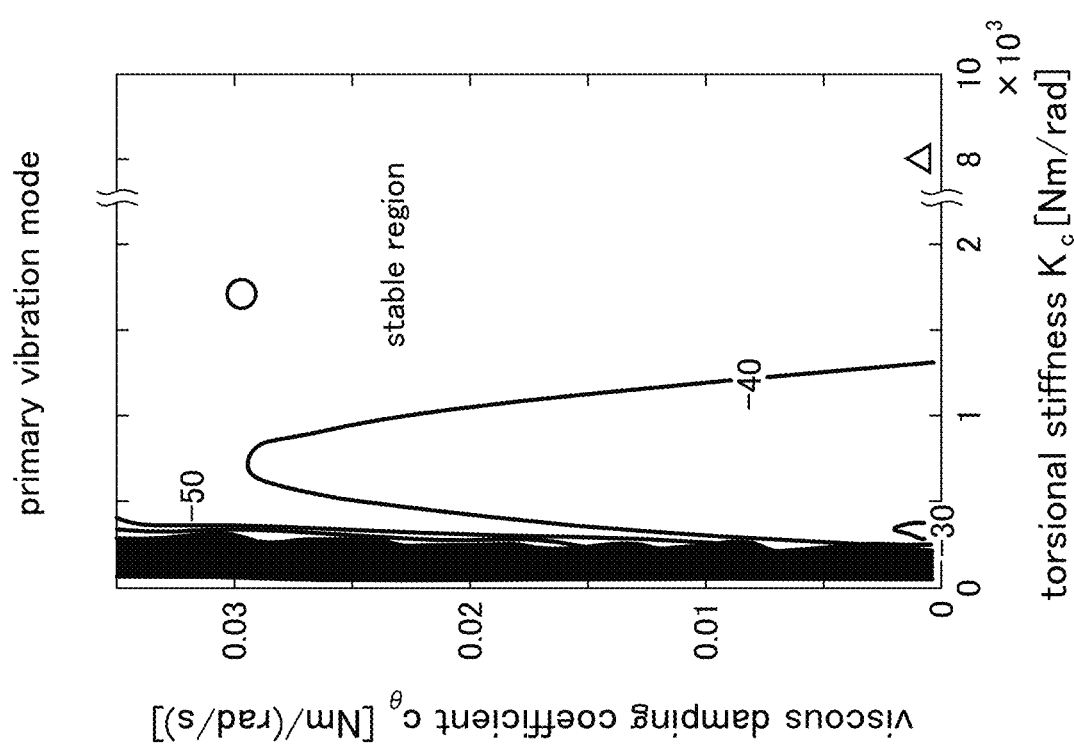
Figure 15A:
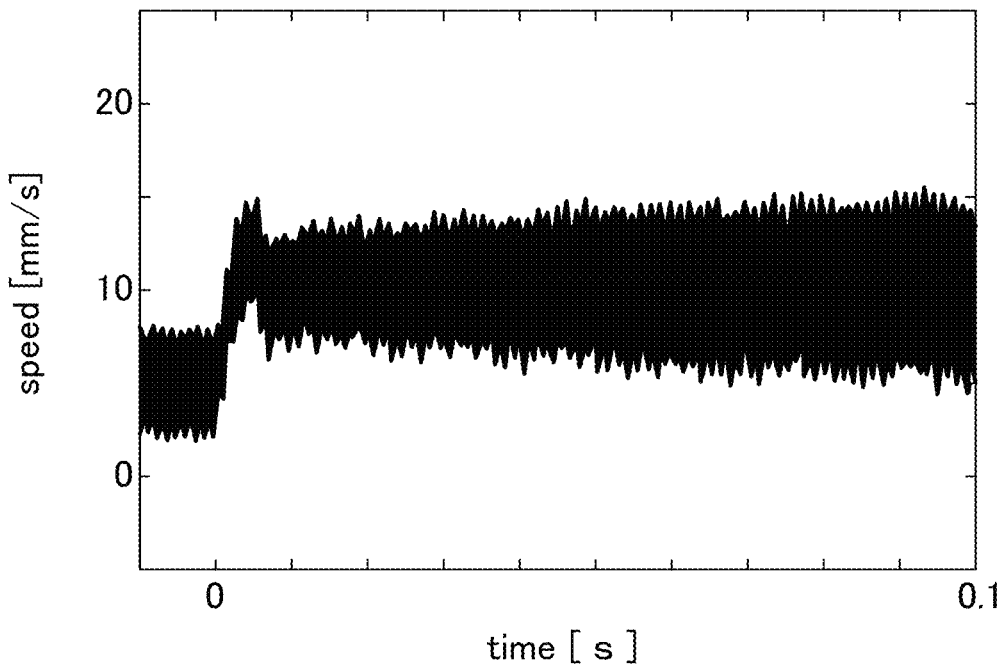
FIG. 15 shows graphs showing changes in the rotational speed when target products given as candidates for the shaft coupling of the second mechanical device (A: first shaft coupling, B: second shaft coupling)
Figure 15B:
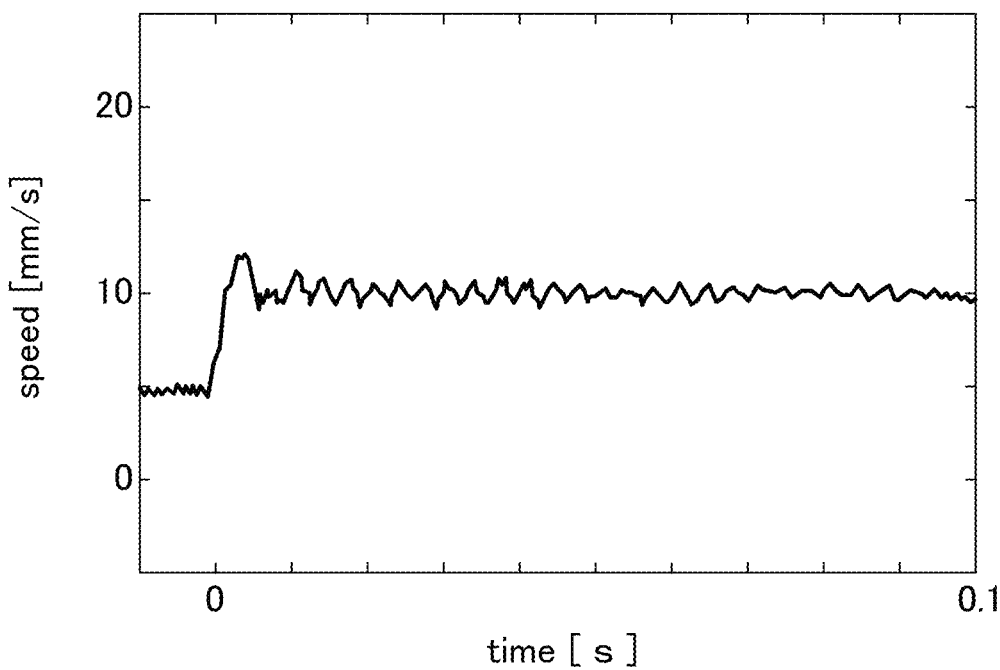
Figure 16:
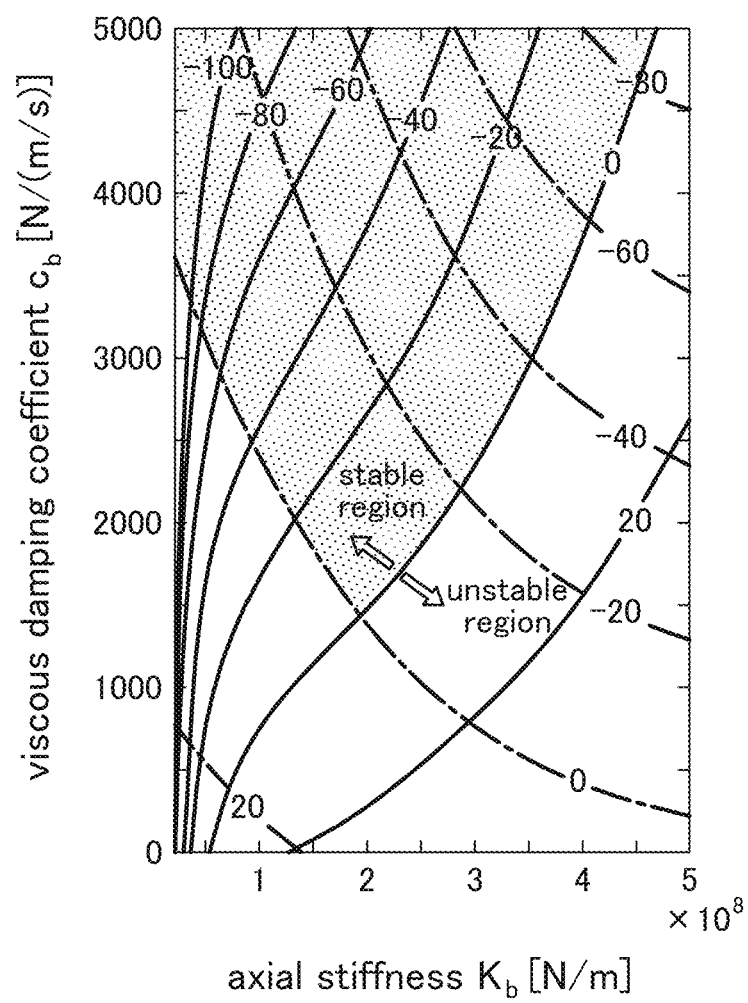
FIG. 16 shows a modification of the stability determination diagram shown in FIG. 14.

FIGS. 14A and 14B are examples of stability determination diagrams regarding the primary vibration mode and the secondary vibration mode of the shaft coupling 58 which is one of the mechanical components of the second mechanical device 51 shown in FIG. 10, respectively. FIGS. 15A and 15B are graphs showing changes in the speed when the target products (the first shaft coupling and the second shaft coupling) representing the shaft coupling 58 of the second mechanical device 51, respectively, are used. FIG. 16 is a graph for a modification of the stability determination diagrams shown in FIGS. 14A and 14B.

In the stability determination diagrams shown in FIGS. 14A and 14B, the stiffness and damping characteristics of the coupling 58 are used as parameters, and indicated along the horizontal axis and the vertical axis, respectively. Here, similarly to the case of FIGS. 12A and 12B, the stability determination diagram for the primary vibration mode and the secondary vibration mode are shown.

As described above, according to the design assist apparatus 1 and the design assist method associated therewith, it is possible to freely select the analysis target and the vibration mode when creating the stability determination diagram. Also, similarly as in the case of FIG. 7 described above, as shown in FIGS. 14A and 14B, the possibility of abnormal vibration occurring in the mechanical device 5 is low in the stable region where the value of the real part of the transfer function is negative, and, on the other hand, there is a high possibility that abnormal vibration occurs in the mechanical device 51 in the unstable region where the value of the real part is positive.

As shown in FIG. 14A, in the mechanical device 51, it can be seen that changing the characteristics of the shaft coupling 58 hardly affects the stability in the first vibration mode. On the other hand, as shown in FIG. 14B, in the secondary vibration mode, it can be seen that the torsional stiffness and viscous damping characteristics of the shaft coupling 58 affect the stability of the mechanical device 51.

FIGS. 15A and 15B show the responses of the mechanical device 51 in the cases of using the first shaft coupling and the second shaft coupling, respectively, when the speed command of the servomotor 57 is changed in a stepwise manner.

Here, the values of the axial stiffness and the axial viscous damping coefficient of the first support bearing are indicated by a triangle mark (Δ) in FIGS. 14A and 14B, and are located in the stable region for the primary vibration mode shown in FIG. 14A, but are located in the unstable region for the secondary vibration mode shown in FIG. 14B. The axial stiffness and the value of the viscous damping coefficient in the axial direction of the second coupling are indicated by a circle mark (○) in FIGS. 14A and 14B, and the mechanical device 51 is in the stable region for both the primary vibration mode shown in FIG. 14A and the secondary vibration mode shown in FIG. 14B.

In the first shaft coupling shown in FIG. 15A, vibration occurs at a higher frequency than in the second support bearing shown in FIG. 15B. This corresponds to the fact that the values of the axial stiffness and the axial viscous damping coefficient of the first shaft coupling are located in the unstable region in the stability determination diagram of the secondary vibration mode. On the other hand, in the second shaft coupling shown in FIG. 15B, it can be seen that the response is not oscillatory, and the second mechanical device 51 can be used in a normal fashion.

According to an analysis result of the feed drive mechanism of the mechanical device 51, the overall performance of the feed drive mechanism can be improved by designing the characteristics of the support bearing 56 so as to be located in the stable region of the stability determination diagram for the primary vibration mode, and then so as to be located in the stable region of the stability determination diagram for the secondary vibration mode. Also, if the stiffness of the support bearing 56 is selected to be intermediate between the value of the first support bearing and the value of the second support bearing, the values can be located in the stable region of the stability determination diagram for both the primary and secondary vibration modes. It is known that the axial stiffness of the support bearing can be adjusted by changing the preload amount of the bearing.

Thus, the user can easily grasp the influence of a plurality of analysis target components on the vibration of the mechanical device 51 by using the design assist apparatus 1 and the design assist method associated therewith. Also, the user can know the stiffness and damping characteristics of the mechanical components that are optimum for improving the performance of the mechanical device 51, and can design the mechanical components (including the selection of the mechanical components) so as to improve the performance of the mechanical device.

The stability determination diagrams were created based on the characteristics of each separate mechanical component (support bearing 56, shaft coupling 58) in FIGS. 12 and FIG. 14, but it is also possible to create a stability determination diagram based on the characteristics of a plurality of mechanical components (for instance, by indicating the stiffness of the support bearing 56 along the horizontal axis, and the stiffness of the shaft coupling 58 along the vertical axis). In addition, at least one of the horizontal axis and the vertical axis of the above described stability determination diagram may indicate a servo gain of the control system for the servomotor 57, the lead of the ball screw 52, or the inertia moment and mass of a mechanical component.

In the examples of FIGS. 12A and 12B, a stability determination diagram was created for each of a plurality of vibration modes, but it is also possible to create a single stability determination diagram including a plurality of stability determination diagrams corresponding to the respective vibration modes which are superimposed one over another to be displayed on the display unit 7.

For example, the stability determination diagram shown in FIG. 16 contains the isolines relating to the first vibration mode and the second vibration mode shown in FIGS. 12A and 12B, and define a stable region (see the dark region in FIG. 16) and an unstable region by taking into account the two vibration modes. The user can thus more reliably grasp the influence of the characteristics of the support bearing 56 on the occurrence of abnormal vibration of the mechanical device by using the stability determination diagram based on the multiple vibration modes. In the design assist apparatus 1 and the design assist method associated therewith, it is also possible to create a single stability determination diagram in which the stability determination diagrams created for each of three or more vibration modes are superimposed one over another.

FIG. 17 is a diagram showing an example of the screen 60 of the GUI created by executing the design assist software on the design assist apparatus 1 regarding the design assist of the second mechanical device 51.

As shown in FIG. 17, the GUI screen 60 includes an analysis parameter setting field 61 that allows a manual input by the user of the ranges of the parameters (here, the axial stiffness and viscous damping in the axial direction of the support bearing 56) of the analysis target components determined by the analysis parameter setting unit 3. The user can appropriately change the analysis target component in the analysis parameter setting field 61. The GUI screen 60 further includes a fixed parameter setting field 62 that allows a manual input by the user of the parameters of mechanical components other than the analysis target components set by the fixed parameter setting unit 4 such as the velocity loop proportional gain Kvp, the velocity loop integral gain Kvi, the axial stiffness, torsional stiffness and viscous damping coefficient of the shaft coupling 58, the axial stiffness and viscous damping coefficient of the bearing, the axial stiffness and the viscous friction coefficient of the nut 53. The GUI screen 60 also includes a vibration mode setting field 64 that allows the user to perform an input operation regarding the vibration mode of the analysis target component set by the vibration mode setting unit 5. In this case, the secondary vibration mode is input (selected) in the vibration mode setting field 64, but the user can also input a primary vibration mode or a plurality of vibration modes shown in FIG. 16. The analysis result output field 63 includes a stability determination diagram 71 corresponding to FIG. 12B and a three-dimensional graph 72 associated therewith. The three-dimensional graph can be displayed from any viewpoint by checking "rotation ON" on the GUI screen. The display of "rotation ON" may be omitted so that rotation may always be possible, or the viewpoint may be fixed. In the analysis result output field 63, it is also possible to display a root locus diagram 75 created by a per known method based on the parameters of the support bearing 56.

The present invention can be applied not only to the case where the applied mechanical device has only one vibration mode but also to cases where the mechanical device has two or more vibration modes with an even greater advantage because the parameters of the mechanical components can be selected so that a stable operation can be ensured in each of the vibration modes. The present invention provides not only measures against abnormal vibration which is found after the mechanical device is manufactured, but also allows various parameters of the mechanical components to be appropriately set in advance of actually manufacturing the mechanical device.

The present invention has been described in terms of specific embodiments, but is not limited by such embodiments, and can be modified in various ways without departing from the scope of the present invention. For example, the design assist apparatus and the design assist method according to the present invention are not limited to the examples described above in the application thereof, and can be applied, for example, to drive mechanisms of various other mechanical devices such as semiconductor manufacturing devices, power steering devices, lift devices (control surface devices) for aircraft, and industrial robots. The various elements of the design assist apparatus, the design assist method, and the design assist program according to the present invention described above in terms of specific embodiments are not entirely essential for the present invention but can be appropriately omitted and substituted without departing from the scope of the present invention.

| GLOSSARY OF TERMS | |
| --- | --- |
| 1 design assist device | 2 transfer function computing unit |
| 3 analysis parameter setting unit | 4 fixed parameter setting unit |
| 5 vibration mode setting unit | |
| 6 stability determination diagram creating unit | |
| 7 display unit | 11 processor |
| 15 input/output bus | 16 input device |
| 17 display device | 18 external storage device |
| 21 first mechanical device | 22 roller |
| 23 electric motor | 24 shaft coupling |
| 30, 60 GUI screen | 31, 61 analysis parameter setting field |
| 32, 62 fixed parameter setting field | 33, 63 analysis result output field |
| 41, 71 stability determination diagram | 42, 72 three-dimensional graph |
| 45, 75 root locus diagram | 51 second mechanical device |
| 52 ball screw | 53 nut |
| 54 table | 55 screw shaft |
| 56 support bearing | 57 servomotor |
| 58 shaft coupling | |

The invention claimed is:

1. A design assist apparatus provided with a processor configured to execute a process of assisting design of a mechanical device driven by a feedback controlled electric motor,
wherein the processor is configured to:
set a plurality of parameters of a mathematical model of a mechanical component forming the mechanical device that are adjustable,
compute a pole of a transfer function of the mechanical device associated with one or more vibration modes of the mechanical device according to the parameters, and
create and display a stability determination diagram including an isoline of a real part of the pole of the transfer function with respect to the parameters, the isoline defining a stable region where a value of the real part is negative and an unstable region where a value of the real part is positive, the stability determination diagram including one or more symbols respectively corresponding to one or more candidates for the mechanical component, each symbol indicating parameters of a corresponding candidate.

2. The design assist apparatus according to claim 1, wherein, when the mechanical device has a plurality of vibrations modes, the stability determination diagram created by the processor includes isolines of the real part of the pole of the transfer function corresponding to the respective vibrations modes.

3. The design assist apparatus according to claim 1, wherein the parameters include parameters related to stiffness and damping characteristics of the mechanical component.

4. The design assist apparatus according to claim 1, wherein when the pole is arranged in descending order of imaginary parts of the pole of the transfer function, the isoline is generated for the real part of the pole which is lower than the pole having the largest imaginary part in absolute value by a difference between a degree of freedom of the mathematical model and a number of the vibration modes.

5. A design assist method for assisting design of a mechanical device driven by a feedback controlled electric motor, comprising the steps of:
setting a plurality of parameters of a mathematical model of a mechanical component forming the mechanical device that are adjustable,
computing a pole of a transfer function of the mechanical device associated with one or more vibration modes of the mechanical device according to the parameters, and
creating and displaying a stability determination diagram including an isoline of a real part of the pole of the transfer function with respect to the parameters, the isoline defining a stable region where a value of the real part is negative and an unstable region where a value of the real part is positive, the stability determination diagram including one or more symbols respectively corresponding to one or more candidates for the mechanical component, each symbol indicating parameters of a corresponding candidate.

6. A computer-readable storage medium storing a design assist program for executing a process for assisting design of a mechanical device driven by a feedback controlled electric motor, the program causing a computer to execute the procedures of:
setting a plurality of parameters of a mathematical model of a mechanical component forming the mechanical device that are adjustable,
computing a pole of a transfer function of the mechanical device associated with one or more vibration modes of the mechanical device according to the parameters, and
creating and displaying a stability determination diagram including an isoline of a real part of the pole of the transfer function with respect to the parameters, the isoline defining a stable region where a value of the real part is negative and an unstable region where a value of the real part is positive, the stability determination diagram including one or more symbols respectively corresponding to one or more candidates for the mechanical component, each symbol indicating parameters of a corresponding candidate.

* * * * *